United States Patent
Choi et al.

(10) Patent No.: US 10,041,550 B2
(45) Date of Patent: Aug. 7, 2018

(54) CLUTCH FOR VEHICLE

(71) Applicant: Hyundai Motor Company, Seoul (KR)

(72) Inventors: Jae Young Choi, Busan (KR); Sung Wha Hong, Hwaseong-si (KR); Jong Yun Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 38 days.

(21) Appl. No.: 15/364,120

(22) Filed: Nov. 29, 2016

(65) Prior Publication Data

US 2018/0112720 A1    Apr. 26, 2018

(30) Foreign Application Priority Data

Oct. 21, 2016   (KR) .................. 10-2016-0137944

(51) Int. Cl.
| | |
|---|---|
| *F16D 13/74* | (2006.01) |
| *F16D 13/72* | (2006.01) |
| *F16D 13/32* | (2006.01) |

(52) U.S. Cl.
CPC ............. *F16D 13/74* (2013.01); *F16D 13/32* (2013.01); *F16D 13/72* (2013.01)

(58) Field of Classification Search
None
See application file for complete search history.

(56) References Cited

U.S. PATENT DOCUMENTS

| | | | | |
|---|---|---|---|---|
| 2,330,024 | A * | 9/1943 | Beardsley, Jr. | F16D 25/00 192/85.21 |
| 2,613,786 | A * | 10/1952 | Emrick | B23G 1/465 192/113.23 |
| 2,865,481 | A * | 12/1958 | Giri De Teramala | F16D 25/0632 192/109 F |
| 3,362,511 | A * | 1/1968 | Aschauer | F16D 25/10 192/113.34 |
| 3,463,281 | A * | 8/1969 | Aschauer | F16D 13/72 188/264 E |
| 3,548,986 | A * | 12/1970 | Fisher | F16D 25/042 188/366 |

(Continued)

FOREIGN PATENT DOCUMENTS

| | | |
|---|---|---|
| JP | 4593983 B2 | 12/2010 |
| KR | 10-0864757 B1 | 10/2008 |

(Continued)

*Primary Examiner* — Colby M Hansen
(74) *Attorney, Agent, or Firm* — Morgan, Lewis & Bockius LLP

(57) ABSTRACT

A clutch for a vehicle may include a first rotor locked to a rotating shaft controlling rotations of the first rotor; a second rotor rotatably provided on the rotating shaft; a clutch part inclinedly protruding from the second rotor toward the first rotor, wherein an outer circumferential surface of the clutch part is configured as a conical surface; an inner ring rotating along with the first rotor; a cone rotating along with the second rotor; an outer ring rotating along with the first rotor; and a sleeve rectilinearly slidable at an outside of an outer circumferential surface of the first rotor along a direction of the rotating shaft to press the outer ring toward the second rotor, forming friction surfaces between the outer ring and the cone, between the cone and the inner ring, and between the inner ring and the clutch part.

7 Claims, 4 Drawing Sheets

(56) References Cited

U.S. PATENT DOCUMENTS

| | | | | |
|---|---|---|---|---|
| 4,262,789 | A | * | 4/1981 | Collins .................. F16D 13/72 |
| | | | | 192/113.31 |
| 4,643,289 | A | * | 2/1987 | Yoneda ................. F16D 13/644 |
| | | | | 192/113.34 |
| 5,857,547 | A | * | 1/1999 | Dequesnes .............. F16D 13/72 |
| | | | | 192/113.23 |
| 5,896,971 | A | * | 4/1999 | Hein ....................... F16D 13/72 |
| | | | | 192/110 B |
| 9,797,458 | B2 | * | 10/2017 | Damm ................... F16D 13/32 |

FOREIGN PATENT DOCUMENTS

| KR | 10-2009-0039382 A | 4/2009 |
|---|---|---|
| KR | 10-2011-0123967 A | 11/2011 |
| KR | 101196996 B1 | 11/2012 |

\* cited by examiner

CLUTCH FOR VEHICLE

CROSS REFERENCE TO RELATED APPLICATION

The present application claims priority to Korean Patent Application No. 10-2016-0137944, filed Oct. 21, 2016, the entire contents of which is incorporated herein for all purposes by this reference.

BACKGROUND OF THE INVENTION

Field of the Invention

The present invention relates generally to a clutch for a vehicle. More particularly, various embodiments of the present invention relate to a technology for a lubrication structure of a clutch configured to control power by being applied to an automotive transmission.

Description of Related Art

Generally, a clutch used for an automotive transmission should not only have a compact configuration resulting from a small volume, but also have high torque capacity for rapid and precise shifting control.

Accordingly, the above mentioned clutch is problematic in that it has a small heat capacity due to the small volume thereof, but it should bear high torque, and thereby by thermal damage may occur by frictional heat. Thus, lubrication and cooling to prevent the damage are required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a clutch for a vehicle, the clutch being capable of being easily applied to a transmission by having a small volume and a compact configuration, and capable of improving durability by having a good cooling performance while having high torque capacity.

In an aspect of the present invention, there is provided a clutch for a vehicle, the clutch including: a first rotor locked to a rotating shaft; a second rotor rotatably provided on the rotating shaft; a clutch part inclinedly protruding from the second rotor toward the first rotor such that an outer circumferential surface of the clutch part is configured as a conical surface; an inner ring rotating along with the first rotor, and configured to provide a friction surface relative to the outer circumferential surface of the clutch part; a cone rotating along with the second rotor, and configured to provide a friction surface relative to an outer circumferential surface of the inner ring; an outer ring rotating along with the first rotor, and configured to provide a friction surface relative to an outer circumferential surface of the cone; and a sleeve rectilinearly sliding at an outside of an outer circumferential surface of the first rotor along a direction of the rotating shaft to press the outer ring toward the second rotor, forming friction surfaces between the outer ring and the cone, between the cone and the inner ring, and between the inner ring and the clutch part.

The second rotor may be provided with a plurality of radial holes penetrating through the clutch part in radial directions of the clutch part, such that oil is moved from inside of the clutch part to a space between the inner ring and the second rotor.

The cone may be integrally provided with a cooling part that extends both from an inner friction surface of the cone rubbing against the inner ring and from an outer friction surface of the cone rubbing against the outer ring toward the second rotor.

The cone may be provided with a plurality of axial holes penetrating through from a surface thereof facing the first rotor to a surface thereof facing the second rotor such that oil placed between the cone and the first rotor flows to a space between the cone and the second rotor, through the axial holes.

Each of the axial holes may be formed to be gradually inclined outward from the first rotor to the second rotor in a radial direction.

The inner ring may be provided with a plurality of inner ring grooves on an end portion thereof facing the first rotor to form passages for allowing the oil supplied from inside of the clutch part to move outward in radial directions toward the axial holes.

The cone may be provided with cone grooves on an end portion thereof facing the first rotor at locations having the axial holes, such that the oil from the inner ring grooves is induced to easily flow to the axial holes.

The clutch for a vehicle according to an exemplary embodiment of the present invention is capable of being easily applied to a transmission by having a small volume and a compact configuration, and is capable of improving durability by having a good cooling performance while having high torque capacity.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
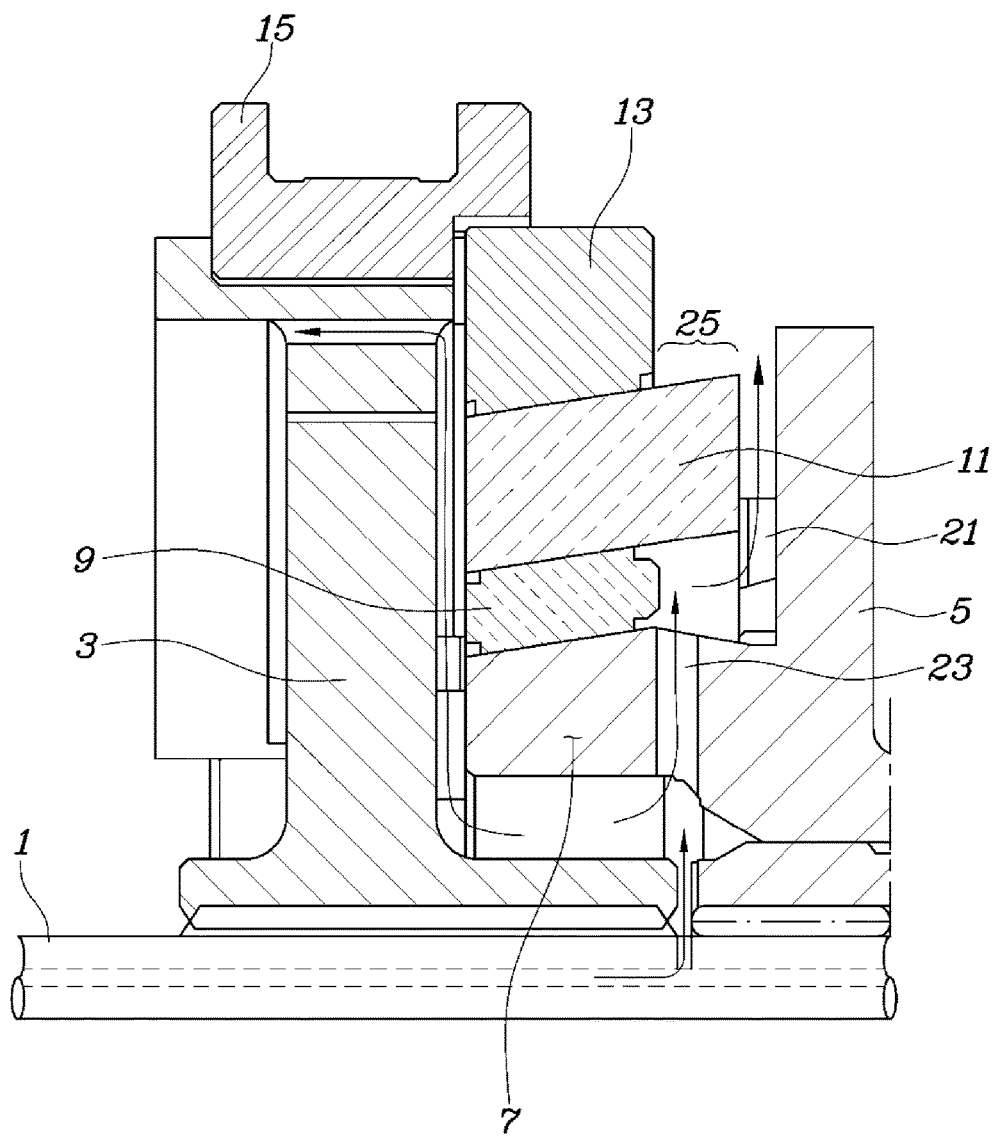
FIG. 1 is a sectional view showing a configuration of a clutch for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, exemplary embodiments of the present invention will be described in detail with reference to the accompanying drawings. Throughout the drawings, the same reference numerals will refer to the same or like parts.

Figure 2:
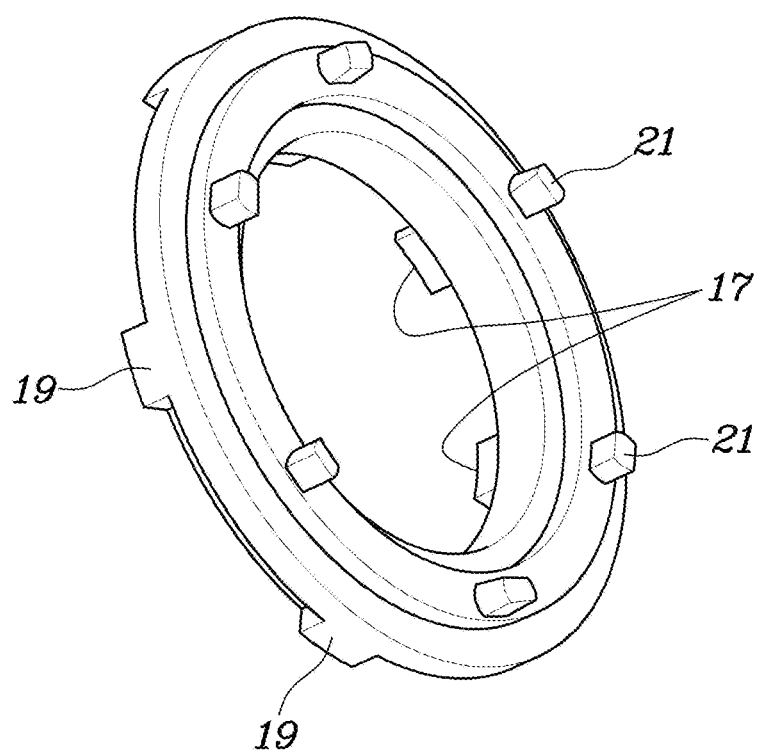
FIG. 2 is a view showing an inner ring, cone, and an outer ring of FIG. 1.

Referring to FIG. 1 and FIG. 2, a clutch for a vehicle according to an exemplary embodiment of the present invention includes: a first rotor 3 locked to a rotating shaft 1; a second rotor 5 rotatably provided on the rotating shaft 1; a clutch part 7 inclinedly protruding from the second rotor 5 toward the first rotor 3 such that an outer circumferential surface of the clutch part 7 is configured as a conical surface; an inner ring 9 rotating along with the first rotor 3, and configured to provide a friction surface relative to the outer circumferential surface of the clutch part 7; a cone 11 rotating along with the second rotor 5, and configured to provide a friction surface relative to an outer circumferential surface of the inner ring 9; an outer ring 13 rotating along with the first rotor 3, and configured to provide a friction surface relative to an outer circumferential surface of the cone 11; and a sleeve 15 rectilinearly sliding at an outside of an outer circumferential surface of the first rotor 3 along a direction of the rotating shaft 1 to press the outer ring 13 toward the second rotor 5, forming friction surfaces between the outer ring 13 and the cone 11, between the cone 11 and the inner ring 9, and between the inner ring 9 and the clutch part 7.

The first rotor 3 is connected to the rotating shaft 1 by using a spline such that the first rotor 3 integrally rotates with the rotating shaft 1; and the second rotor 5 provided to be adjacent to the first rotor 3 is connected to the rotating shaft 1 by using a bearing, and the first and second rotors are rotatable relative to the rotating shaft 1. By operation of the sleeve 15, torque is transmitted between the first rotor 3 and the second rotor 5 by frictional forces among the outer ring 13, the inner ring 9, the cone 11, and the clutch part 7.

The sleeve 15 rectilinearly slides toward the second rotor 5 by being connected to the outer circumferential surface of the first rotor 3 by using a device including a spline, such that torque is transmitted between the first rotor 3 and the second rotor 5, and on the contrary, when the sleeve moves to an opposite direction, torque transmission is prevented.

As described above, the clutch part 7 is integrally provided in the second rotor 5; the inner ring 9 and the outer ring 13 are respectively provided with inner ring protrusions 17 and outer ring protrusions 19 facing the first rotor 3 to rotate along with the first rotor 3; and the cone 11 is provided with cone protrusions 21 facing the second rotor 5 to rotate along with the second rotor 5.

The outer circumferential surface of the clutch part 7 is formed to be a conical surface, the diameter of which is gradually reduced toward the first rotor 3; and the friction surfaces between the inner ring 9 and the clutch part 7, between the cone 11 and the inner ring 9, and between the outer ring 13 and the cone 11 are configured to be a conical surface that is inclined in the same direction as the outer circumferential surface of the clutch part 7.

Accordingly, when the sleeve 15 rectilinearly slides toward the second rotor 5, the sleeve presses the outer ring 13 toward the second rotor 5, and the conical friction surfaces are respectively formed between the outer ring 13 and the cone 11, between the cone 11 and the inner ring 9, and between the inner ring 9 and the clutch part 7 by the pressure, transmitting power.

Heat is generated on the friction surfaces by friction, and to secure durability of the clutch according to an exemplary embodiment of the present invention, it is required to remove the heat effectively. To achieve this, the second rotor 5 is provided with a plurality of radial holes 23 penetrating through the clutch part 7 in a radial direction of the clutch part 7, such that oil is moved from inside of the clutch part 7 to a space between the inner ring 9 and the second rotor 5.

Herein, the oil inside the clutch part 7 may be supplied from an oil passage formed in the rotating shaft 1.

Accordingly, it is possible to effectively cool the heat generated by friction between the inner ring 9 and the clutch part 7 while the oil flows through the radial holes 23.

Further, to secure improved cooling performance, the cone 11 is integrally provided with a cooling part 25 that extends both from an inner friction surface of the cone rubbing against the inner ring 9 and from an outer friction surface of the cone rubbing against the outer ring 13 toward the second rotor 5.

In other words, as shown in the drawings, an axial length of the cone is configured to be different from axial lengths of the inner ring 9 and the outer ring 13. To achieve this, the cone further protrudes toward the second rotor 5 to be exposed outside, and it is possible to quickly remove heat simultaneously generated from the inner and outer circumferential surfaces of the cone through the cooling part 25.

Of course, the oil having passed through the radial holes 23 is supplied to the cooling part 25 to cool the cooling part 25.

Figure 3:
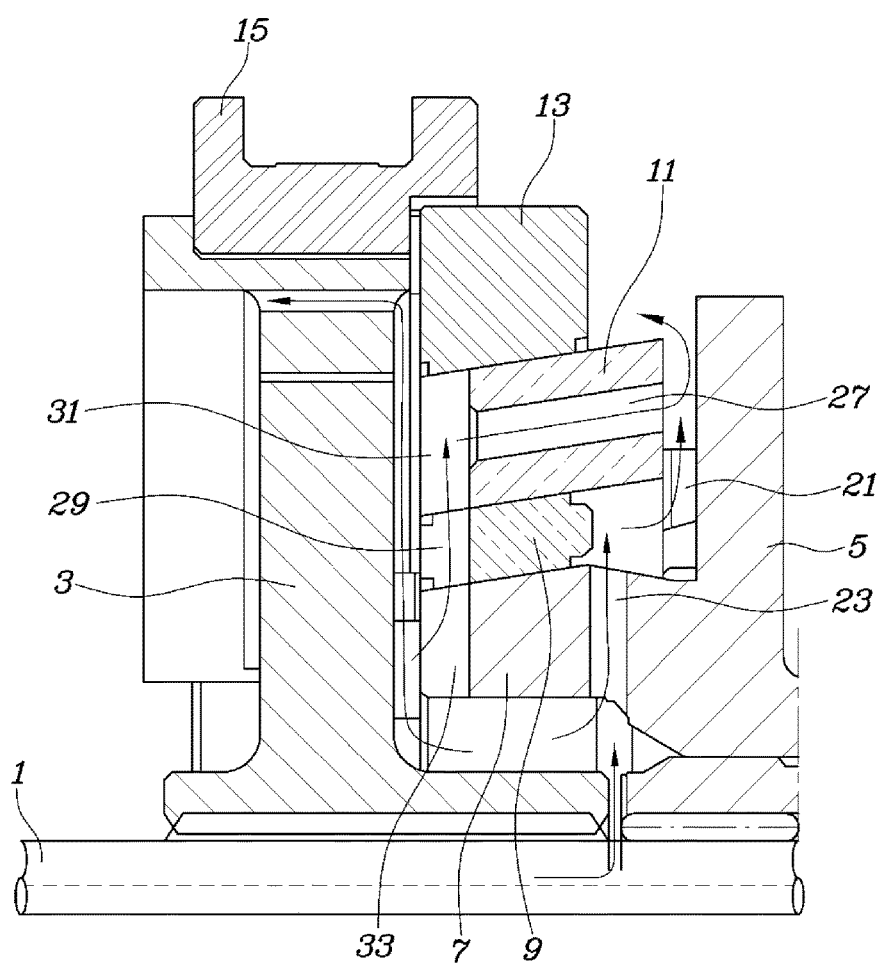
FIG. 3 is a sectional view showing another exemplary embodiment of the present invention.
Figure 4:
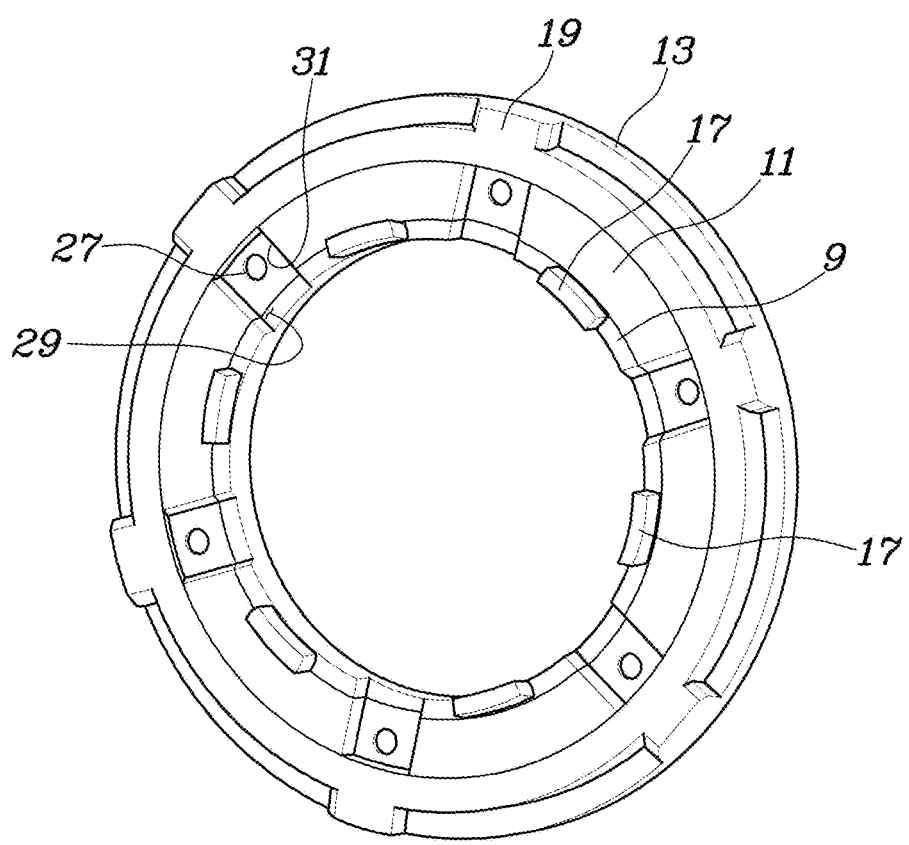
FIG. 4 is a view showing an inner ring, cone, and an outer ring of FIG. 3.

FIG. 3 and FIG. 4 show another exemplary embodiment of the present invention, so reference to the same configurations as the embodiment of FIG. 1 and FIG. 2 will be skipped, and additional configurations will be described, hereinbelow.

Referring to FIG. 3 and FIG. 4, the cone 11 is provided with a plurality of axial holes 27 penetrating through from a surface thereof facing the first rotor 3 to a surface thereof facing the second rotor 5 such that the oil placed between the cone 11 and the first rotor 3 flows to a space between the cone 11 and the second rotor 5, through the axial holes 27.

In other words, frictional heat is generated simultaneously from the inner and outer circumferential surfaces of the cone 11, and when viewed from a radial direction, since the inside surface of the cone is surrounded by the inner ring 9 and the clutch part 7, and the outer circumferential surface of the cone is surrounded by the outer ring 13, it is difficult to secure a heat dissipation surface area for dissipating heat. For this reason, the above mentioned axial holes 27 are provided to allow the oil to pass directly through the cone 11 to achieve cooling.

Each of the axial holes 27 is formed to be gradually inclined outward from the first rotor 3 to the second rotor 5 in a radial direction, such that the oil flows fast and easily through the axial holes 27 by centrifugal force, improving the cooling performance of the cone 11.

The inner ring 9 is provided with a plurality of inner ring grooves 29 on an end portion end portion thereof facing the first rotor 3 to form passages for allowing the oil supplied from inside of the clutch part 7 to move outward in radial directions toward the axial holes 27; and the cone 11 is provided with cone grooves 31 on an end portion thereof facing the first rotor 3 at locations having the axial holes 27 such that the oil from the inner ring grooves 29 is induced to easily flow to the axial holes 27, and the oil is easily induced to flow from inside the clutch part 7 toward the axial holes 27 through both the inner ring grooves 29 and the cone grooves 31, which is helpful in cooling the inner ring 9 as well as the cone 11.

Of course, the clutch part 7 is provided with clutch part grooves 33 at an edge portion thereof for allowing the oil to flow from inside the clutch part 7 to the inner ring grooves 29 and the cone grooves 31.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutch for a vehicle, the clutch comprising:
   a first rotor locked to a rotating shaft;
   a second rotor rotatably provided on the rotating shaft;
   a clutch part inclinedly protruding from the second rotor toward the first rotor, wherein an outer circumferential surface of the clutch part is configured as a conical surface;
   an inner ring rotating along with the first rotor, and configured to provide a friction surface relative to the outer circumferential surface of the clutch part;
   a cone rotating along with the second rotor, and configured to provide a friction surface relative to an outer circumferential surface of the inner ring;
   an outer ring rotating along with the first rotor, and configured to provide a friction surface relative to an outer circumferential surface of the cone; and
   a sleeve rectilinearly slidable at an outside of an outer circumferential surface of the first rotor along a direction of the rotating shaft to press the outer ring toward the second rotor, forming friction surfaces between the outer ring and the cone, between the cone and the inner ring, and between the inner ring and the clutch part.

2. The clutch of claim 1, wherein
   the second rotor is provided with a plurality of radial openings penetrating through the clutch part in radial directions of the clutch part, wherein oil is moved from inside of the clutch part to a space between the inner ring and the second rotor.

3. The clutch of claim 1, wherein
   the cone is integrally provided with a cooling part that extends both from an inner friction surface of the cone rubbing against the inner ring and from an outer friction surface of the cone rubbing against the outer ring toward the second rotor.

4. The clutch of claim 1, wherein
   the cone is provided with a plurality of axial openings penetrating through from a surface thereof facing the first rotor to a surface thereof facing the second rotor, wherein oil placed between the cone and the first rotor flows to a space between the cone and the second rotor, through the axial openings.

5. The clutch of claim 4, wherein
   each of the axial openings is formed to be inclined outward from the first rotor to the second rotor in a radial direction.

6. The clutch of claim 4, wherein
   the inner ring is provided with a plurality of inner ring grooves on an end thereof facing the first rotor to form passages for allowing the oil supplied from inside of the clutch part to move outward in radial directions toward the axial openings.

7. The clutch of claim 6, wherein
   the cone is provided with cone grooves on an end portion thereof facing the first rotor at locations having the axial openings, wherein the oil from the inner ring grooves is induced to flow to the axial openings.

* * * * *